United States Patent
Travis

(10) Patent No.: US 7,101,048 B2
(45) Date of Patent: Sep. 5, 2006

(54) FLAT-PANEL PROJECTION DISPLAY

(75) Inventor: Adrian Robert Leigh Travis, South Devon (GB)

(73) Assignee: Cambridge Flat Protection Displays Limited, (GB)

(*) Notice: Subject to any disclaimer, the term of this patent is extended or adjusted under 35 U.S.C. 154(b) by 47 days.

(21) Appl. No.: 10/490,246

(22) PCT Filed: Sep. 25, 2001

(86) PCT No.: PCT/GB01/04269

§ 371 (c)(1),
(2), (4) Date: Mar. 19, 2004

(87) PCT Pub. No.: WO03/027754

PCT Pub. Date: Apr. 3, 2003

(65) Prior Publication Data

US 2004/0246391 A1    Dec. 9, 2004

(51) Int. Cl.
*G03B 21/14*    (2006.01)
*G03B 21/00*    (2006.01)
*G03B 27/22*    (2006.01)
*G02F 1/1335*    (2006.01)
*G03H 1/00*    (2006.01)

(52) U.S. Cl. ............... 353/69; 353/7; 353/8; 353/122; 349/11; 359/13; 359/462; 359/478; 359/630; 345/8

(58) Field of Classification Search ........... 353/5, 353/6, 7, 8, 10, 11, 12, 13, 14, 62, 69, 81, 353/122; 349/5, 8, 11; 359/13–15, 19, 22, 359/23, 27, 28, 630, 462, 466, 467, 478; 345/8; 356/328
See application file for complete search history.

(56) References Cited

U.S. PATENT DOCUMENTS

| 4,790,613 | A | 12/1988 | Moss ........................ 350/3.7 |
| 5,381,502 | A | 1/1995 | Veligdan .................... 385/115 |
| 5,452,385 | A | 9/1995 | Izumi et al. ................. 385/37 |
| 5,465,311 | A | 11/1995 | Caulfield et al. ............ 385/27 |
| 5,600,454 | A | 2/1997 | Trayner et al. .............. 359/15 |
| 5,668,913 | A | 9/1997 | Tai et al. ................... 385/146 |

(Continued)

FOREIGN PATENT DOCUMENTS

DE    19636459 A    3/1998

(Continued)

OTHER PUBLICATIONS

Amitai, Y., "Visor-display design based on planar holographic optics," Applied Optics, Mar. 10, 1995, pp. 1352-1356, vol. 34, No. 8, Optical Society of America.

(Continued)

*Primary Examiner*—Melissa Jan Koval
(74) *Attorney, Agent, or Firm*—Young & Basile, P.C.

(57) ABSTRACT

A flat-panel projection display comprises a slab waveguide having a preferably embossed diffraction grating on one face, a lens for directing light into an edge of the waveguide, and in the focal plane of the lens a liquid-crystal modulator for modulating the intensity of the light as a function of lateral position and elevational direction of travel. The light is ejected from the slab waveguide by the grating at angles corresponding to the input angles, giving a virtual display. The light from the modulator can be expanded in one dimension by passing through a magnifying waveguide, followed by scattering in the plane by a screen and projection by a lens at the other end of the waveguide. Head-up and 3-D displays can be constructed using this principle.

24 Claims, 8 Drawing Sheets

U.S. PATENT DOCUMENTS

| | | | |
|---|---|---|---|
| 6,002,826 A | 12/1999 | Veligdan | 327/277 |
| 6,181,367 B1 | 1/2001 | McGrew et al. | 348/41 |
| 6,300,986 B1 | 10/2001 | Travis | 349/5 |
| 6,657,723 B1* | 12/2003 | Cohen et al. | 356/328 |
| 6,712,471 B1* | 3/2004 | Travis et al. | 353/7 |
| 2002/0008854 A1* | 1/2002 | Leigh Travis | 353/69 |
| 2004/0130797 A1* | 7/2004 | Leigh Travis | 359/631 |

FOREIGN PATENT DOCUMENTS

| | | |
|---|---|---|
| DE | 19646943 A1 | 5/1998 |
| EP | 0676902 A2 | 10/1995 |
| EP | 0866264 A1 | 9/1998 |
| WO | WO 93/09450 A | 5/1993 |
| WO | WO 98/15128 A | 4/1998 |
| WO | WO 00/04407 A | 1/2000 |
| WO | WO 00/58932 A | 10/2000 |
| WO | WO 01/72037 A1 | 9/2001 |
| WO | WO 02/082168 A1 | 10/2002 |

OTHER PUBLICATIONS

Chen, C. H., et al., "Strategies for 3D video with wide fields-of-view," IEE Proc.-Optoelectron, Apr. 2001, pp. 85-90, vol. 148, No. 2, Univ. of Cambridge, Cambridge, UK.

Travis, A. R. L., "Autostereoscopic 3-D display," Applied Optics, Oct. 10, 1990, pp. 4341-4343, vol. 29, No. 29, Optical Society of America.

* cited by examiner

FLAT-PANEL PROJECTION DISPLAY

FIELD OF THE INVENTION

This invention relates to 3D displays, head-mounted displays and other compact projection displays.

BACKGROUND OF THE INVENTION

Projection displays conventionally comprise a two-dimensional array of light emitters and a projection lens. The lens forms an image of the array at some plane in space, and if this imaging plane is far from the projection lens, so that the light rays are more or less parallel, then the effect of the projection lens is essentially to collimate light from any pixel on the two-dimensional array.

Projection displays are most commonly configured so that the image of the array falls on a large translucent screen, and a viewer looking at the screen will see a greatly magnified image of the picture on the two-dimensional array. However, it is becoming increasingly common for small projection displays to be mounted on the head of a viewer so that the projection display is directed towards the viewer's eye, and light collimated by the projection lens from a single pixel on the two-dimensional array of light emitters is subsequently focused by the viewer's cornea onto the retina so that the viewer sees an apparently distant image often known as a virtual image.

It is also possible to place a large-diameter projection display comprising a two-dimensional array of directional light emitters behind a liquid-crystal display or some other spatial light modulator in order to synthesize a three-dimensional image. See, for example, Travis, A. R. L., "Autostereoscopic 3-D display", *Applied Optics*, Vol. 29, no. 29, pp. 4341–3. One pixel at a time of the two-dimensional array of light emitters is illuminated, and an appropriate view of a three-dimensional object is simultaneously displayed on the liquid-crystal display in such a way that the view of the three-dimensional object is only visible if observed from the direction in which the rays of light collimated by the projection lens from the pixel are traveling. A sequence of views is repeated at a rate faster than that at which the eye can detect flicker, thereby time-multiplexing a three-dimensional image.

This display is three-dimensional but not holographic. It is possible in principle to create a holographic three-dimensional image by placing a two-dimensional array of point-source light emitters in the focal plane of the projection lens, illuminating each point source in turn, and displaying appropriate holograms on a liquid-crystal display placed on top of the projection lens so that each hologram is made visible to a different point of view in turn.

Head-mounted displays are bulky and users would prefer that they were flat. A head-mounted display can be made flatter using a slab waveguide incorporating a weak hologram, as shown by Amitai, Reinhorn and Friesem, "Visor-display design based on planar holographic optics," *Applied Optics*, Vol. 34, No. 8, pp. 1352 to 1356, 10 Mar. 1995. Light from a cathode-ray tube and hologram is coupled into the waveguide, and this light will be diffracted out of the waveguide (i.e. normal to the slab) by the hologram in directions which are determined by the pixel within the cathode-ray tube from which the light was emitted.

Three-dimensional images synthesized by time-multi-plexing the illumination of a liquid-crystal display require the liquid-crystal display to have a fast-switching array of thin-film transistors and these are expensive. Trayner and Orr in U.S. Pat. No. 5,600,454 describe a device which avoids this by placing a hologram behind a conventional liquid-crystal display that directs the illumination of alternate rows to a left-eye or right-eye view. But both this and the switched-illumination concept are bulky, and do not exhibit the flatness needed for head-mounted displays.

Instead, a flat-panel three-dimensional display can be made by combining a projection display with a screen from which light shone parallel to the surface of the screen is ejected at one of a set of selectable lines along the screen, as described in the inventor's earlier application PCT/GB 97/02710 (WO 98/15128). One line at a time on the screen is selected, and simultaneously the projection display projects a line of pixels parallel to the screen so that they are ejected at the selected line. The same line of pixels on the projection display is altered repeatedly as each of the series of lines on the screen is selected in turn in such a way as to time-multiplex a complete image on the screen. Only one line of the projection display is used, so the array of light emitters need be only one line high, and if the emitted light is collimated in the plane of the screen then the projection lens need be only one or two millimeters high so that the combined projector and screen are flat.

If it is light from a three-dimensional display, albeit one whose array of light emitters is only one pixel high, that is directed parallel to the surface of the screen of selectable lines, then the image formed on the screen is three-dimensional. The three-dimensional display might comprise an array of light emitters behind a projection lens with a liquid-crystal display in front of the projection lens, as described above, but in order to put up several views within one line period of the display the switching rate of the liquid crystal would need to equal the number of views times the line rate of the display, and few liquid-crystal mixtures switch this fast.

Many other kinds of autostereoscopic and holographic three-dimensional display concepts exist and any could be used in a flat-panel system. Particularly interesting is an old concept comprising a group of small video projectors in the focal plane of a field lens. Each projector is positioned to form a view in the plane of the field lens just as if the lens were a translucent screen, but unlike a translucent screen the field lens collimates the light so that the picture is visible from only a single direction. The other projectors form views which are made visible by the field lens to other directions so that the viewer sees an autostereoscopic three-dimensional image. However, viewers prefer three-dimensional images to be autostereoscopic both in azimuth and in elevation, and little consideration has been given with this concept to making views vary with elevation.

SUMMARY OF THE INVENTION

According to the present invention there is provided a flat-panel projection-display comprising a slab waveguide having a preferably embossed diffraction grating on one face, a lens for directing light into an edge of the waveguide, and in the focal plane of the lens means for modulating the intensity of the light as a function of lateral position and elevational direction of travel.

This arrangement converts pixels from the modulating means into plane waves impinging at different angles on the waveguide, which are then diffracted at corresponding angles out of the face of the waveguide. A virtual image is thus formed on the waveguide, which can be used, for instance, for head-up displays or 3-D displays.

To inject more light into the waveguide the display preferably includes a one-dimensional screen for spreading the light over the width of the edge of the slab. This screen can itself be embodied in a waveguide, and mirrors can be associated with the end or ends of the waveguides to retain the light. The input waveguide can also magnify the input image. The display can be folded by the use of prismatic waveguide ends. Waveguide lenses are also envisaged.

BRIEF DESCRIPTION OF THE DRAWINGS

For a better understanding of the invention, specific embodiments will now be described by way of example with reference to the accompanying drawings, in which.

DETAILED DESCRIPTION

Figure 1:
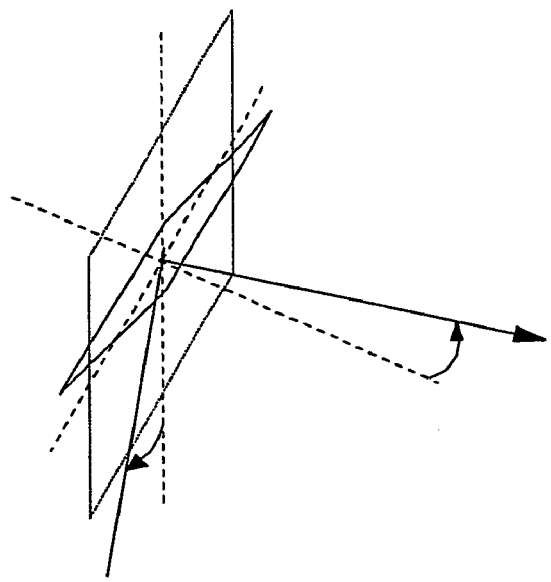
FIG. 1 illustrates a mirror angled to reflect vertically incident light through 90°, representing background to the invention.

It is a simple experiment to shine light vertically up at a mirror pivoted at 45° to the horizontal and FIG. 1 shows how the mirror reflects the light into the horizontal plane (dotted line). If the direction of the incident light is rotated in the vertical plane away from the initial direction of the reflected light, then the direction of the reflected light is rotated in the horizontal plane. Similarly if the direction of the incident light is rotated in the plane shared by the incident and reflected light, then the direction of the reflected light is rotated in the same vertical plane through an equal angle.

Figure 2:
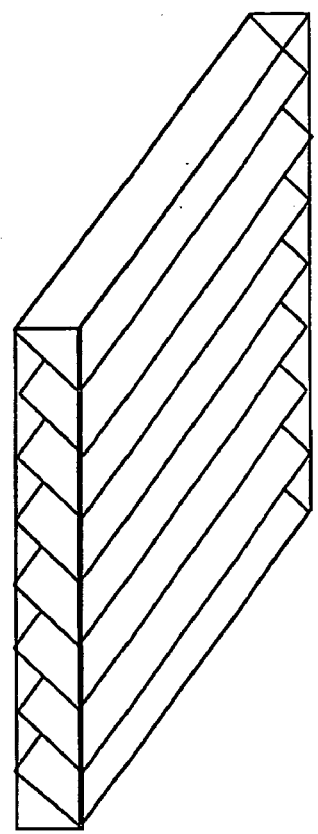
FIG. 2 illustrates a series of mirrors similar to the single mirror of FIG. 1.

Mirrors can be made partially reflective, and a series of mirrors pivoted at 45° can be stacked one on top of another as shown in FIG. 2 so that light shone vertically up at the bottom mirror and not reflected by that mirror will pass through successive mirrors of the stack until the light is all reflected. The series of mirrors behaves in the same way as a single mirror in that if the direction of the incoming light is rotated in the appropriate vertical plane, then the direction of the reflected light is rotated in the horizontal plane. If these mirrors are sufficiently wide and thin and if there are enough of them then the result is a flat panel device from all parts of whose surface light can be made to travel in any single, selectable horizontal direction. One cannot rotate the direction of the incident light in the plane shared by incident and reflected light without causing the light to stray from the plane of the stack of mirrors, but if the stack is encapsulated in a slab waveguide then the waveguide will keep the light confined to the stack and it will become possible to rotate the direction of the reflected light in the vertical plane. However, a ray bouncing between the two walls of a slab waveguide will travel in either of two directions alternately, so the stack of mirrors will eject rays traveling in two different directions.

Figure 3:
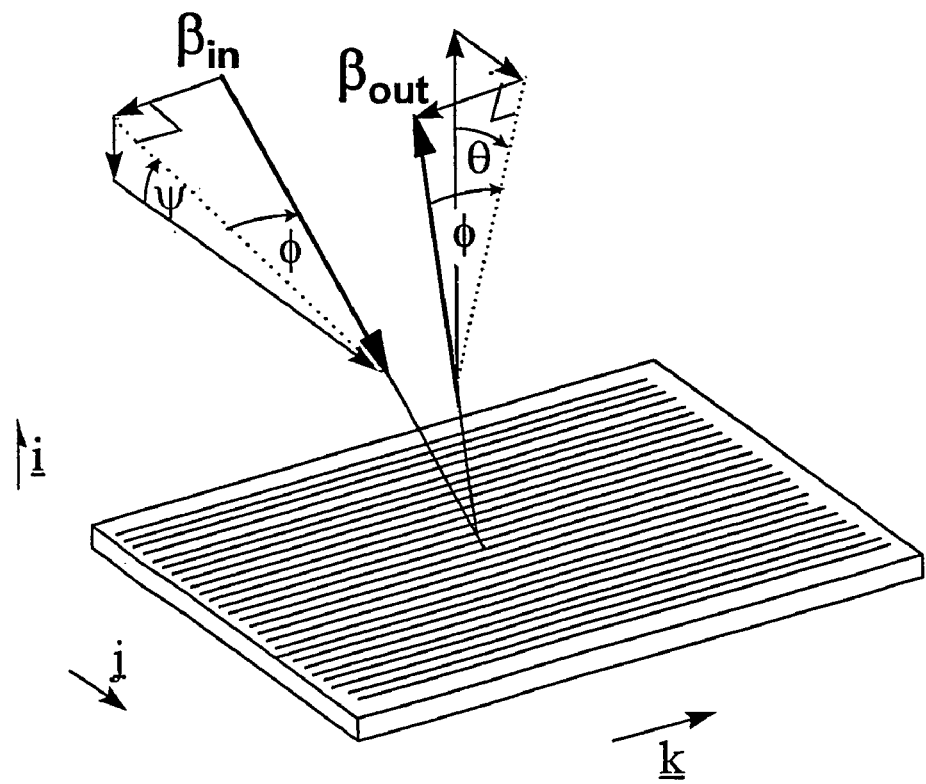
FIG. 3 illustrates how the direction of light coupled out of a slab waveguide by a grating embossed on one face of the slab waveguide is determined by the direction of light injected into the waveguide and the periodicity of the grating.

Another way of ejecting a ray of light propagating in a slab waveguide normal to the surface of the waveguide is to have a grating of appropriate spatial frequency embossed on one surface of the waveguide, as shown in FIG. 3. Just as with the mirrors of FIG. 1 and FIG. 2, rotating the direction of the guided ray by an angle θ about an axis normal to the surface of the waveguide will cause the direction of the ejected ray to rotate through the same angle in the plane shared by the normal and any line of the grating. As FIG. 3 shows, it is also possible to make the direction of the ejected ray alter in the orthogonal direction by altering the angle of the propagating ray about an axis parallel to any line of the grating. The ray only interacts with the grating during reflection, so rays will be ejected traveling in only one direction (provided that the grating is blazed, or the direction of the other first diffracted order is within the critical angle).

Suppose that the wavelength of the ray is λ, the grating spacing is d, the direction of the grating periodicity is j, the normal to the plane of the grating is I and the third direction is k. If the ray of light is incident on the grating at an arbitrary angle, and angles φ, Ψ and θ are as depicted in FIG. 3, then the wave-vector of the incident light, $\beta_{in}$, can be expressed as:

$$\beta_{in} = \frac{2\pi}{\lambda}\cos\phi(\cos\psi i + \sin\psi j) + \frac{2\pi}{\lambda}\sin\phi k$$

The wave vector of the first-order diffracted ray, $\beta_{out}$, will be:

$$\beta_{out} = \frac{2\pi}{\lambda}\cos\phi(\cos\theta i + \sin\theta j) + \frac{2\pi}{\lambda}\sin\phi k$$

φ is the same for both input and output, so the angle of azimuth at which the ray leaves the grating is uninfluenced by the ray's angle of elevation. But θ is different from Ψ and this leads to distortion in the other axis.

Figure 4:
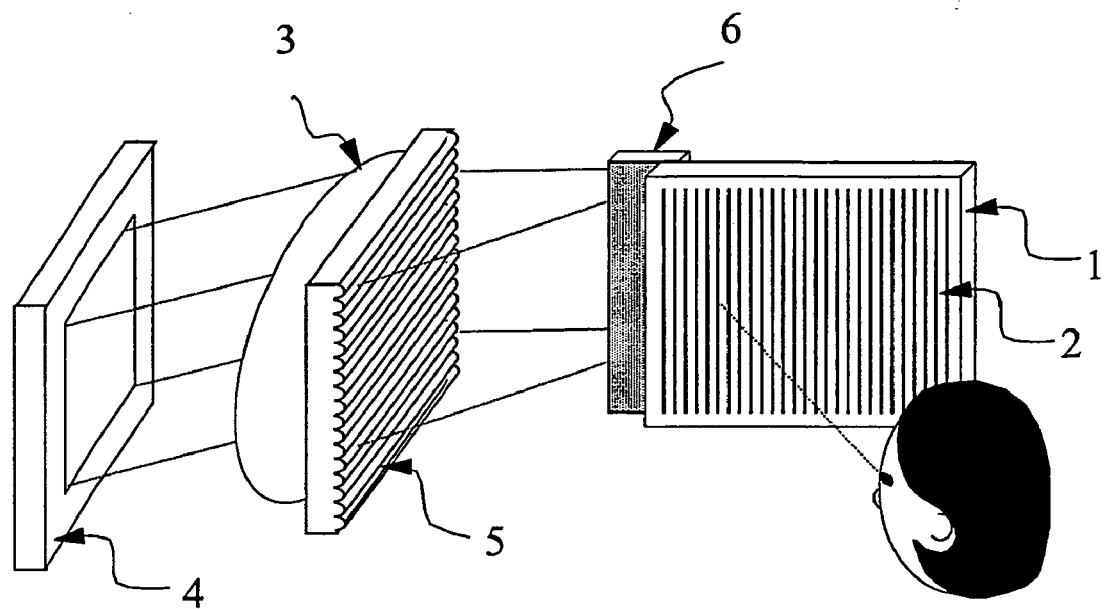
FIG. 4 illustrates a flat-panel projection display embodying the invention.

The flat-panel projection display illustrated in FIG. 4 represents an embodiment of the invention using the above principle. It comprises a slab waveguide 1, a weak diffraction grating 2 embossed on the slab waveguide, a lens 3, a liquid-crystal display 4 illuminated preferably with collimated light, a one-dimensionally translucent screen 5 and a front-silvered mirror 6. One end of the slab waveguide 1 is placed in one focal plane of the lens 3, and the liquid-crystal display 4 is placed in the other focal plane of the lens 3, so that light from any pixel on the liquid-crystal display 4 will be collimated into a plane wave, part of which will enter the end of the slab waveguide 1. One face of the slab waveguide 1 is embossed with a weak diffraction grating 2 such that as the wave propagates down the waveguide 1 part of it is continually diffracted out of the waveguide. Diffracted components of the wave emerge from all parts of the diffraction grating 2 and combine into a single wavefront whose direction is determined by the pixel on the liquid-crystal display 4 through which the light passed. Waves traveling in other directions are modulated by other pixels on the liquid-crystal display 4, with the result that a complete (two-dimensional) virtual image is projected from a slim, flat waveguide 1.

For greater efficiency it is preferable that all the light from the liquid-crystal display 4 is injected into the end of the slab waveguide 1. To this end the illumination of the waveguide 1 comprises collimated rays which are passed through the one-dimensionally translucent screen 5 adjacent to the liquid-crystal display 4. The screen 5 might comprise for example an array of small cylindrical lenslets which diffuse the rays over a range of angles in one (the vertical) dimension but leave them collimated in the other dimension so that in the other focal plane of the lens 3 the whole of the end of the slab waveguide 1 is illuminated.

It is also preferable that light coming from one pixel of the liquid-crystal display 4 is injected into only one mode of the slab waveguide 1. This requires that as the plane wave is injected into the end of the slab waveguide 1 there is also injected a plane wave of equal intensity having the same component of direction resolved in the plane of the waveguide 1, but the opposite component of direction resolved perpendicular to the waveguide 1. In terms of a ray description the purpose of this second wave is to fill in the gaps on the front of the slab waveguide 1 which would otherwise be left unilluminated by the original wave. The second wave can be provided by placing the front of a front-silvered mirror 6 against the front of the slab waveguide 1 so that the mirror 6 protrudes beyond the end of the waveguide 1. Light from the liquid-crystal display 4 must be sufficiently diffuse in both dimensions to illuminate both the end of the waveguide 1 and its image in the mirror 6; this can be done either by adding a second weak one-dimensionally translucent screen orthogonal to the first, or by making the pixels of the liquid-crystal display 4 small enough to cause the diffusion by diffraction.

Figure 5:
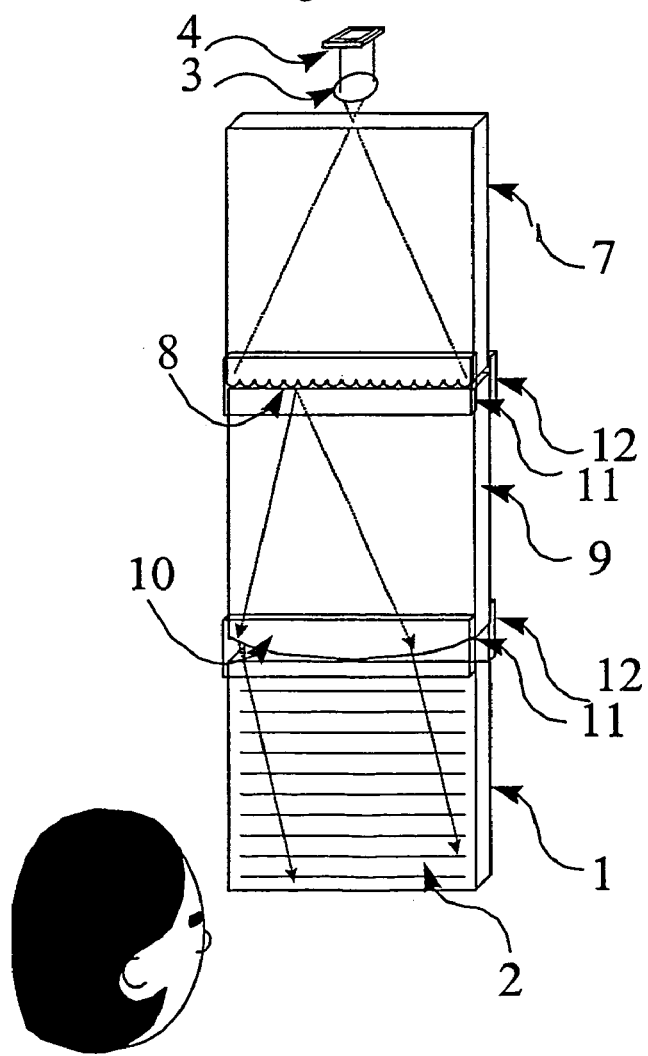
FIG. 5 illustrates a flat-panel projection display with a large screen, the image being magnified from a microprojector.

One class of projection display, the head-up display, is commonly found in aircraft and comprises a large (several inches in diagonal) screen from all parts of which is projected a (virtual) image which comes into focus in the far field. The flat-panel projection display described above could be configured to make such a head-up display, but the lens 3 and liquid-crystal display 4 would be inconveniently large. FIG. 5 shows how the image from a small liquid-crystal display 4 can be magnified by projection within a second slab waveguide 7 of similar dimensions to the display waveguide 1. The liquid-crystal display 4 is placed in one plane of a projection lens 3 and the end of this slab waveguide 7 in the other, and the liquid-crystal display 4 is illuminated by collimated light. Rays from a single row of the liquid-crystal display 4 have a direction within the slab waveguide 7 which, resolved in a plane normal to the liquid-crystal rows (left to right in the diagram), have a single angle (sometimes called the out-of-plane angle). However, rays from a single column of the liquid-crystal display 4 are projected to a single zone of the end of the magnifying waveguide 7, and a one-dimensionally translucent screen 8 is placed at the end of the slab waveguide 7 so as to preserve the out-of-plane angle of the rays, but to scatter their angle in the plane of the slab waveguide 7 (sometimes called the in-plane angle). This in effect produces a one-dimensionally magnified real image at the screen 8.

The rays are then coupled into a third length of slab waveguide 9 at the end of which is a cylindrical lens 10, preferably integral with the waveguide itself, whose axis is orthogonal to the plane of the slab waveguides. The one-dimensionally translucent screen 8 is to be in the focal plane of the cylindrical lens 10 so that rays from any point on the screen 8 are collimated as they leave the lens 10. Instead of a lens a mirror could be used, with appropriate re-configuration of the waveguides; a mirror in fact gives rise to less distortion.

The light is then passed into the slab waveguide 1 embossed with a weak diffraction grating 2, and diffracted out, as above, to give a far-field-projected image. In order to confine rays to the same out-of-plane angle throughout, the one-dimensionally translucent screen 8 and cylindrical lens 10 are made with the same thickness as the slab waveguides, and the fronts of a pair of front-silvered mirrors 11, 12 are placed above and below each of the interface elements 8, 10 so as to confine rays to the same out-of-plane angle. The one-dimensionally translucent screen 8 can be formed for example of an array of cylindrical lenslets.

Figure 6:
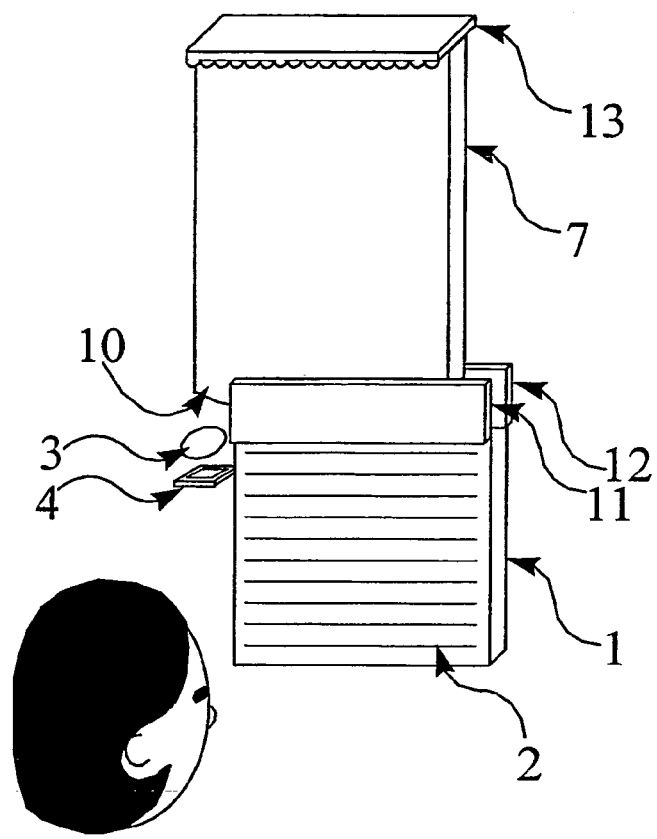
FIG. 6 illustrates a version of the display shown in FIG. 5 which uses a one-dimensionally translucent screen that is reflective instead of transmissive.

The large flat-panel projection display of FIG. 5 is long, and it is difficult to cut and polish the array of cylindrical lenslets used to effect the one-dimensionally translucent screen 8 to the same thickness as the adjacent slab waveguides 7, 9 within optical tolerances. FIG. 6 shows how matters can be improved by using a translucent or one-dimensionally specular mirror 13 instead of a translucent screen 8. The one-dimensionally translucent mirror is simply an array of cylindrical lenslets coated with aluminium, and this can be placed close enough to the end of the magnifying slab waveguide 7 that despite the absence of front-silvered mirrors 11, 12 there is minimal loss of ray confinement during reflection off the translucent mirror 13. Here the one waveguide 7 serves both for magnification and for collimation by virtue of the double pass of the light through it.

Figure 7:
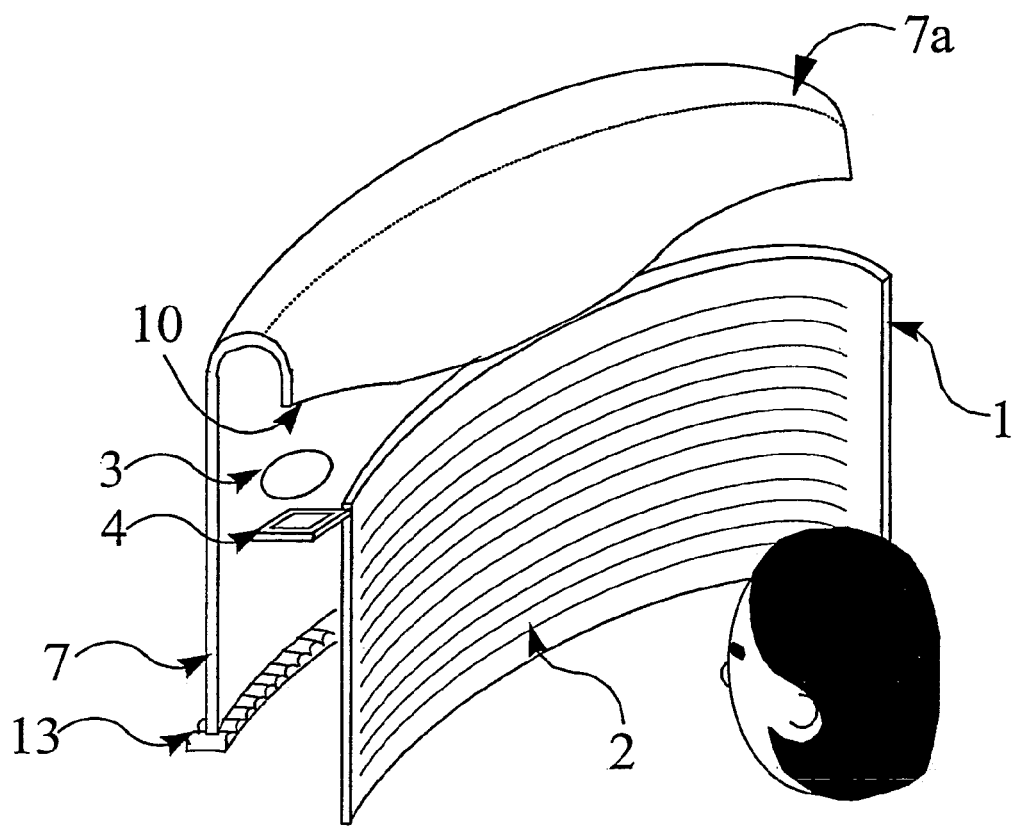
FIG. 7 illustrates a folded version of the display shown in FIG. 6 with the screen curved round the viewer so as to address the viewer's peripheral vision.

The flat-panel projection display of FIG. 6 is still rather long. It is well known that a bend with a small radius of curvature in a waveguide will alter the out-of-plane angle of a ray, but a bend with a sufficiently large radius of curvature will not disrupt rays and it has been found by experiment that a radius of curvature of 5 cm is not disruptive. FIG. 7 shows how a bend 7a can be introduced to fold the system of FIG. 6 in effect folding the waveguide 7 back behind the screen 1. In FIG. 7 the screen 1 is also curved about a vertical axis so that a viewer sitting near the center of the curve will see pictures with his or her peripheral vision. Curving the screen 1 without further modification will cause rays from a single pixel to converge instead of being collimated as required. The solution is to move the one-dimensionally translucent mirror 13 closer to the cylindrical lens 10; there will be a distance where the convergence lost by doing this will cancel out the extra convergence caused by curving the screen. Although head-up displays are commonly used in aircraft, it is thought that this design of display will be sufficiently cheap for very large (perhaps a couple of meters diagonal) displays to be built, and that the displays might be used in offices either to display virtual-reality images, or as a screen more comfortable for the long-sighted viewer.

A second class of projection display, the head-mounted display, is commonly used to display virtual-reality images, but existing displays are bulky and grotesque. Users would prefer a display to be flat and slim like a pair of sunglasses, but while all the displays so far described have flat slab waveguides, the projector is relatively bulky. Liquid-crystal displays can be miniaturized, but it is difficult to make liquid-crystal pixels smaller than two or three microns, and the resulting display is still too big.

Figure 8:
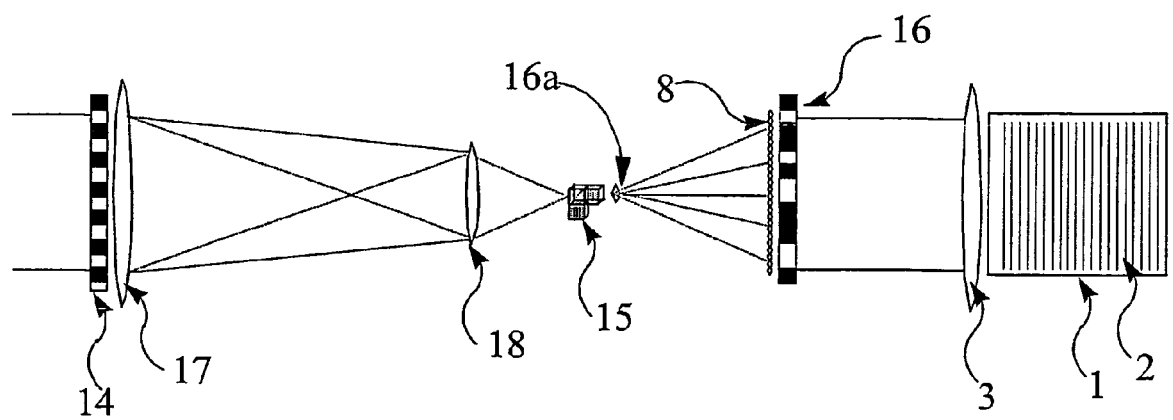
FIG. 8 illustrates a row-and-column-multiplexed flat-panel projection display.
Figure 9:
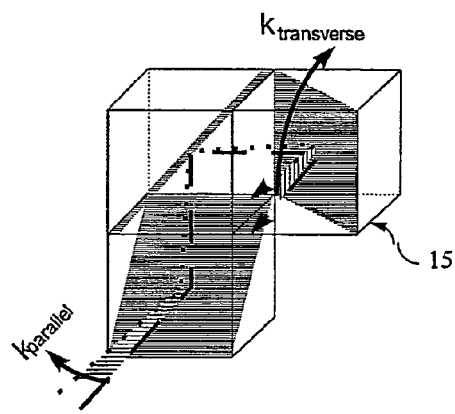
FIG. 9 shows how a prism can convert in-plane variations in the ray direction ($k_{parallel}$) into out-of-plane variations in ray direction ($k_{transverse}$)

FIG. 8 shows how two one-dimensional liquid-crystal displays or devices can be used to synthesize a projected image in a flat device. The first liquid-crystal display 14 is configured as a grating and when illuminated with collimated light will diffract the light in two directions at equal but opposite in-plane angles to the central axis. The light then passes by way of a pair of lenses 17, 18 (whose function is described below) through a micro-prism 15, shown in detail in FIG. 9, as having three cubes with successive 45° mirrors, which rotates the incoming light by 90° so as to convert in-plane changes of ray direction to out-of-plane changes of ray direction. The light is also reversed in direction but for convenience whits is not shown in FIG. 8.

The rays are then expanded by a cylindrical lens or mirror 16a to illuminate the whole of a one-dimensionally translucent screen 8 adjacent to the second one-dimensional liquid-crystal display 16. The second liquid-crystal display 16 is in the focal plane of a final cylindrical lens 10, and modulates the in-plane angles of light entering the final slab waveguide 1. Rays at each angle are converted by the weak diffraction grating embossed on the slab waveguide 1 into columns in the far-field-projected image. The first liquid-crystal display 14 modulates the out-of-plane angle of all rays entering the final slab waveguide 1, which is converted by the weak diffraction grating 2 into a row in the far-field image. For each out-of-plane angle selected by the first liquid-crystal display 14, the second liquid-crystal display 16 modulates all in-plane angles, and a far-field-projected picture is written line by line in much the same way as in a cathode ray tube.

Although liquid-crystal pixels can be made with dimensions of 2 or 3 microns, it is easier to make pixels with dimensions of 20 or 30 microns, but the maximum angle of diffraction achievable with such pixels is approximately 1°. The two lenses 17, 18 between the first liquid-crystal display 14 and the micro-prism 15 magnify this maximum angle of diffraction to 10° or more. The first of the two lenses 17 has a focal length at least ten times greater than the second 18, and they share a focal plane so that at the micro-prism 15, which is in the unshared focal plane of the second lens 18, rays enter the prism 15 at a constant point but from a variety of angles.

If the first liquid-crystal display 14 modulates amplitude in the conventional manner, then light will be transmitted in the zero (undiffracted) order and in the second and higher diffracted orders as well as in the first order. The second and higher diffracted orders can be minimized by choosing a suitable grating pattern, while the zero order can be eliminated by placing opaque material at the center of the focal plane shared by both lenses 17, 18. The zero order will not arise if the liquid-crystal display 14 comprises ferroelectric liquid crystal configured to modulate the phase of light by 0° and 180°, and since both liquid-crystal displays 14, 16 may need to be ferroelectric in order to switch sufficiently quickly this alternative may be preferable.

Figure 10:
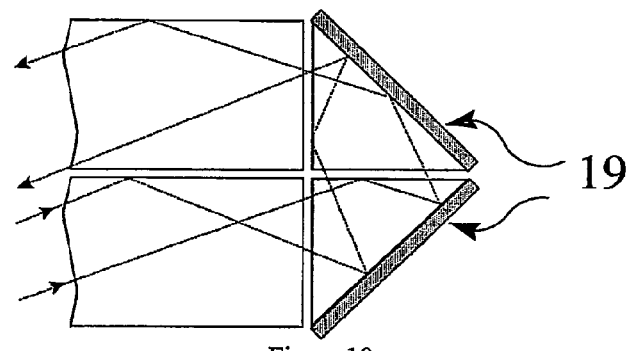
FIG. 10 shows how prisms can be used to fold a flat-panel projection display.

It remains to fold the system of FIG. 8 into an area the same size as a spectacle lens, but bending the waveguide through a radius of curvature of 5 cm would make the result much too bulky. Instead FIG. 10 shows how a pair of right-angled prisms 19 can be used to fold the waveguide; such an arrangement can also be used for the previous embodiments. A low-refractive-index material must be placed on both transmissive surfaces of each right-angled prism 19 in order to keep rays confined to the correct in-plane angle, and the 45° surface of each right angled prism 19 must be silvered in order that light is also reflected at acute angles.

Figure 11:
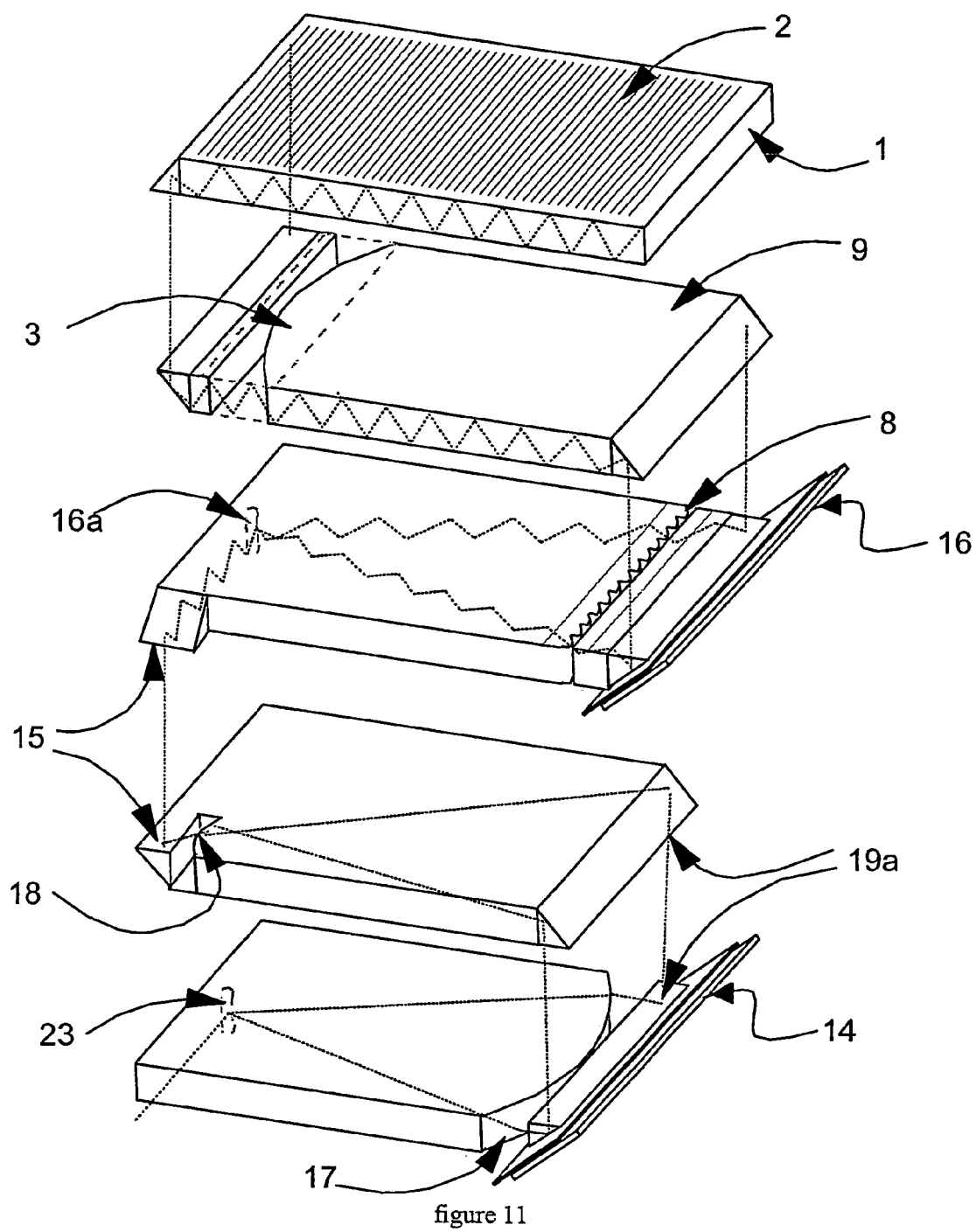
FIG. 11 is a blown-up view of a folded row-and-column-multiplexed flat-panel projection display.
Figure 12:
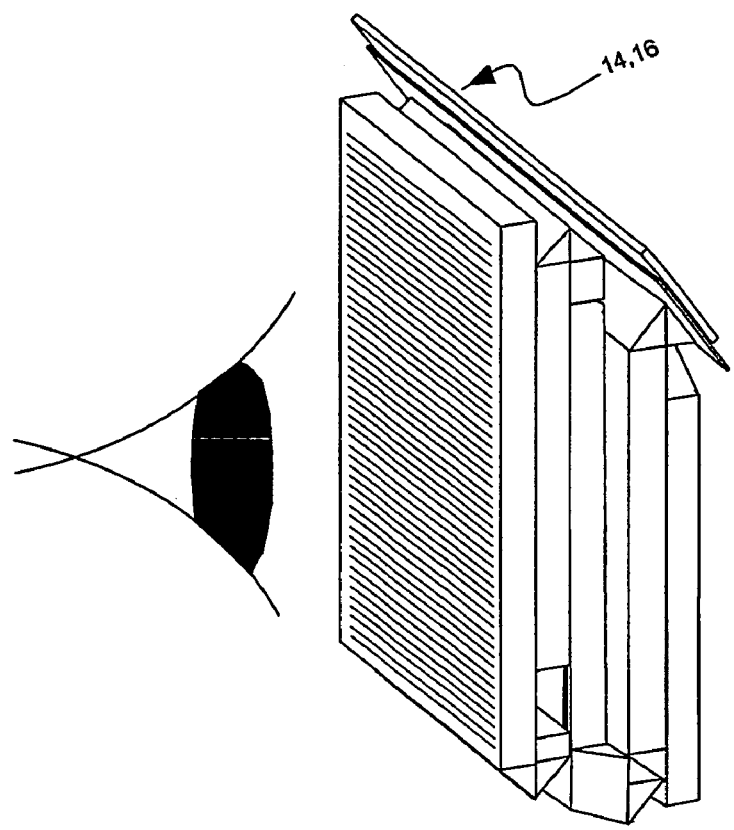
FIG. 12 is a compact view of a folded row-and-column-multiplexed flat-panel projection display and shows how the liquid-crystal display is at 45° to the plane of the flat panel.

FIG. 11 shows an expanded view of each layer of the folded system of FIG. 8, and FIG. 12 shows the compressed system. The two liquid-crystal displays 14, 16 are parts of a single liquid-crystal device shown in FIG. 12 whose liquid-crystal layer is sandwiched between a single glass or silicon substrate and a transparent top layer which might be made of Mylar and is kept as thin as possible in order to avoid the in-plane angle of rays being corrupted, or the rays being allowed to escape.

In this device light enters from the side of the first slab, and is scattered or expanded by a front-silvered cylindrical mirror 23 to form a plane wave which is then split by the grating LCD 14 and sent up to the next slab by a first prism pair 19a. Here the light is converged to a corner equivalent to the micro-prism 15 via a lens 18 analogous to the lens 3 in FIG. 5, and is sent up to the third slab, the "magnifying" slab 7, with the one-dimensionally translucent lens 8 and the second LCD 16. The out-of-plane reflections start in the third slab, as shown. The fourth slab 9 is the cylindrical collimating lens 10 and the final slab is the display or output slab 1.

Figure 13:
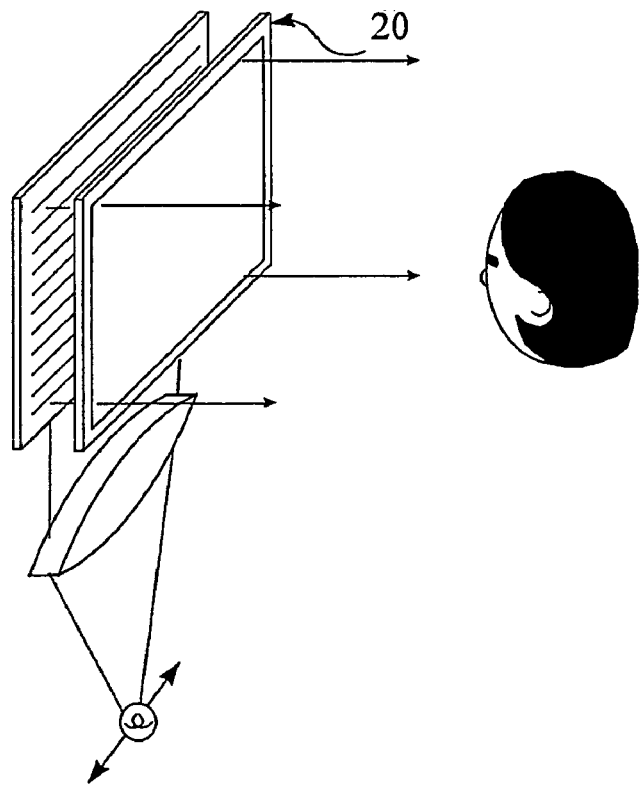
FIG. 13 illustrates a flat-panel three-dimensional display.

A third class of projection display, the three-dimensional display, is finding uses in amusement arcades and operating theaters, but existing displays are too bulky. Just as a three-dimensional display can be made by placing a large projection display behind a high-frame-rate liquid-crystal display, FIG. 13 shows how a flat three-dimensional display can be made by placing behind a liquid-crystal display 20 a flat-panel projection display such as that shown in FIG. 5. Here the slab functions simply as a source of collimated light scanned through the range of output angles by transverse movement or scanning of the light source transversely, in synchrony with the modulator 20, as shown by the arrows. For a 3-D display no modulation in elevation is needed and the grating need not be a regular diffraction granting but can simply be a set of parallel scattering lines. The frame rate of liquid-crystal displays is limited by the conductivity of the patterned layer by which a voltage is placed across each pixel, and the conductivity of the layer can be increased if it is made so thick that it is opaque. For example, a microdisplay can be made with a frame rate of 20 kHz by placing a layer of ferroelectric liquid-crystal over a crystalline silicon integrated circuit, but the liquid-crystal display will then only work in reflection.

Figure 14:
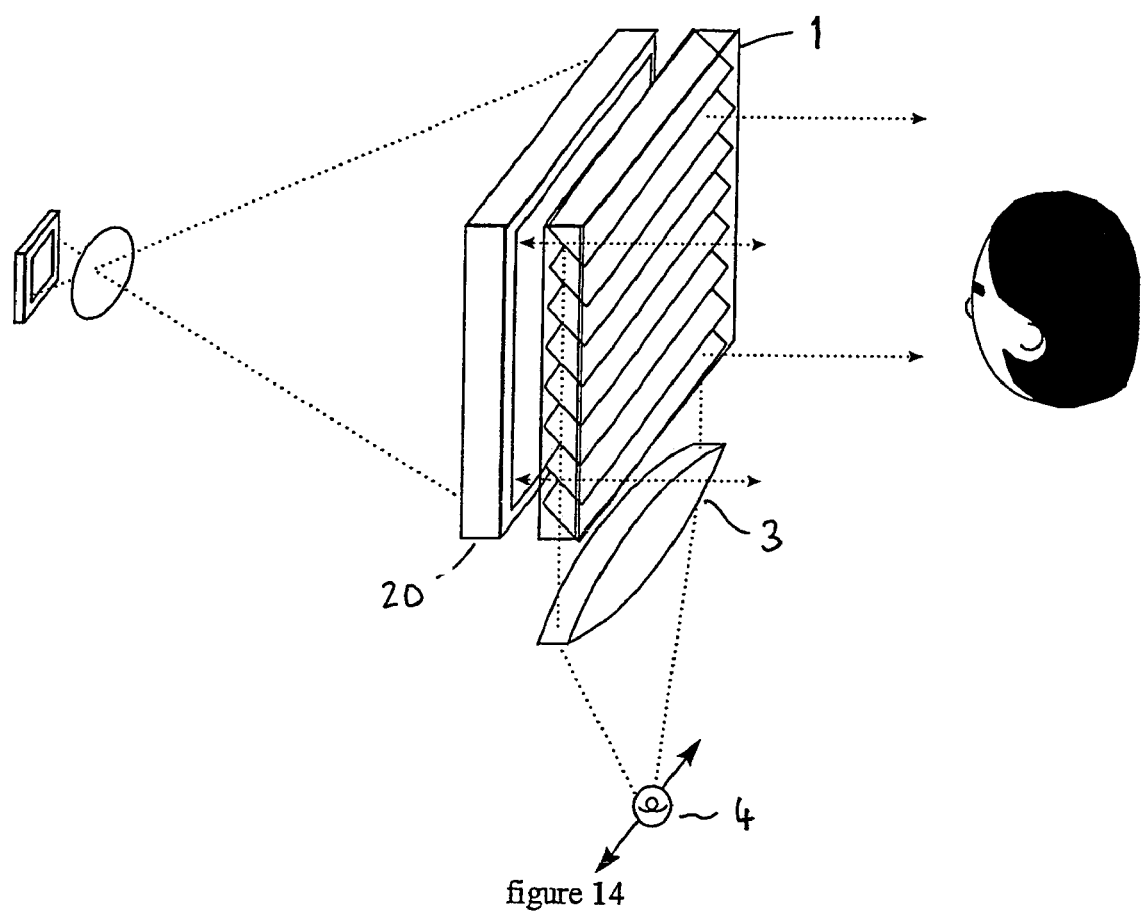
FIG. 14 illustrates flat-panel illumination of a three-dimensional display using a reflective liquid-crystal display such as an optically addressed spatial light modulator.

Another way of making a liquid-crystal display with a high frame rate is to project an image onto the photosensitive side of an optically addressed spatial light modulator, but this device also only works in reflection. FIG. 14 shows how a flat-panel projection display can be used to provide front illumination by the use of a slab waveguide 1 with a volume hologram or a stack of partial mirrors at 45° to the plane and axially parallel to the entry edge of the slab 1. Mirrors—e.g. a stack of glass slides—are preferable for HUD applications because they do not cause spurious diffraction of sunlight into the user's eyes, as a hologram tends to do. The transversely modulated light from the source 4 is directed into the slab 1 by the lens 3. It is reflected backwards, by the partial mirrors or the hologram, towards the LCD 20 which is in effect an array of mirror pixels. These mirror pixels are modulated by a projector 30 to be on or off, depending on the image at the particular angle of view that is currently being produced. The image then passes back though the slab 1, where nearly all of it is transmitted, to the viewer.

A flat-panel projection display can also be used to front-illuminate a still hologram by configuring the display to illuminate the hologram with waves collimated in a single direction. The technique can also be extended to provide flat-panel illumination of a wide-field-of-view holographic video display by using the flat-panel projection display to illuminate a liquid-crystal display 20 with waves collimated in one at a time of several discrete directions, simultaneously writing appropriate holograms on the liquid-crystal display, and repeating the sequence within the flicker response time of the eye.

It is difficult to deposit on large screens the thin-film transistors needed for high-frame-rate liquid-crystal displays, and WO 98/15128 describes how a three-dimensional display can be made instead by shining light parallel to the surface of a screen which incorporates a set of lines any one of which will eject the light from the screen when it is selected. But that document explains only how such a device can produce images which are three-dimensional in azimuth. For true three-dimensional or virtual-reality images it is necessary to control the intensity of a ray leaving any point of the screen as a function of its direction both in azimuth and in elevation.

Figure 15:
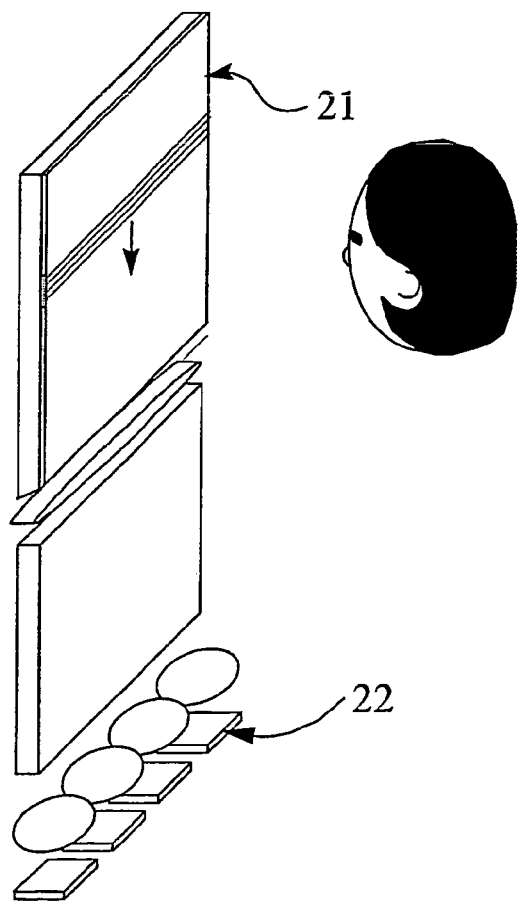
FIG. 15 illustrates a flat-panel scanning-line three-dimensional display.

FIG. 15 shows how a three-dimensional display with control of elevation is made by combining a projection display with a screen 21 on which light shone approximately parallel to the surface of the screen 21 is ejected at one of a set of selectable lines along the screen 21. This generally follows the scheme set out in the inventor's earlier WO 98/15128. But now the screen 21 is configured as a slab waveguide, and all lines of the projection display are modulated, so that there is control of both the in-plane angle and the out-of-plane angle of rays within the slab waveguide. The cladding of the slab waveguide here comprises nano-droplet polymer-dispersed liquid-crystal which is a material whose bulk refractive index can be controlled with a voltage. It is pixellated into a series of lines so that light will be ejected from the slab waveguide at the line where the refractive index of the cladding has been reduced. The ray direction in azimuth will be controlled by the in-plane direction of the rays within the slab waveguide, but the ray direction in elevation will be determined by the out-of-plane direction of the rays. If the projection display 22 constitutes a video hologram, then the pattern of light ejected at the selected line will also constitute a hologram, and this gives a way of screening a video hologram which is three-dimensional both in azimuth and in elevation without the need for thin-film transistors. However, the field of view of the hologram in elevation will be narrow. Wider fields of view in elevation can be created by using a switchable liquid-crystal grating to eject the light, varying the spatial frequency of the liquid-crystal grating so as to project one-by-one several holograms to different angles in elevation from each line.

Figure 16:
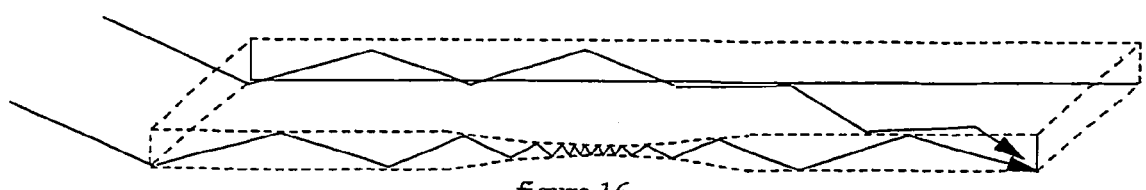
FIG. 16 illustrates how a variable-thickness waveguide can be used to act as a lens.

Several of the embodiments described so far have required the use of a cylindrical lens between adjacent waveguides, but including the lens as a separate element requires that the surfaces between waveguide and lens have to be polished, and this is costly. FIG. 16 shows how the out-of-plane angle of a ray in a waveguide will become greater if the waveguide becomes gradually thinner. If the out-of-plane angle of the ray is large, then the component of ray velocity in the plane of the waveguide decreases. Just as lenses focus collimated light by having thick centers so as to slow the central part of the wave with respect to the periphery, a waveguide can be made to focus a collimated wave by making the central part of the waveguide thinner than the edges. Such "lenses" can be used in all the described embodiments, and indeed in any flat optical system requiring a lens.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A flat-panel projection display comprising a waveguide system including a display slab waveguide having a grating acting to cause light propagating in the waveguide to emerge from one face of the waveguide, a lens element for directing light into an edge of the waveguide system, and means located in the focal plane of the lens element for modulating the intensity of the light as a function of lateral position and of elevational direction of travel, relative to the waveguide, the grating being such as to eject light directed into the waveguide system from the slab towards a viewer at an angle depending on the said lateral position and elevational direction.

2. A display according to claim 1, in which the modulating means includes a liquid-crystal modulator.

3. A display according to claim 1, further including a screen for spreading the light in the waveguide system one-dimensionally over the width of the edge of the slab.

4. A flat-panel projection display according to claim 3, in which the modulator and lens element are smaller in the lateral direction than the slab is, and the waveguide system includes a magnifying slab waveguide of matching width placed between the lens element and the display slab waveguide so as to expand the light from the lens to the fill width of the display waveguide.

5. A flat-panel projection display according to claim 4, in which the screen is a one-dimensionally translucent strip at the end of the magnifying waveguide, conserving out-of plane angle but spreading light in the plane.

6. A flat-panel projection display according to claim 4, in which the waveguide system includes an intermediate slab waveguide coupling the light from the magnifying waveguide into the display waveguide.

7. A flat-panel projection display according to claim 6, in which the intermediate waveguide is the same as the magnifying waveguide, the light passing tough the waveguide in one direction for magnifying, and passing back in the reverse direction for coupling into the display waveguide.

8. A fat-panel projection display according to claim 7, in which the screen is a one-dimensional cylindrical mirror strip at the end of the magnifying waveguide, conserving out-of plane angle but spreading light in the plane.

9. A flat-panel projection display according to claim 6, in which the waveguide system includes a lens or mirror associated with the intermediate waveguide for creating a far-field (parallel-ray) image entering into the display waveguide.

10. A flat-panel projection display according to claim 4, in which any or all of the slabs are coupled in the out-of-plane direction by mirrors covering the line between adjacent slabs.

11. A flat-panel projection display according to claim 9, in which the magnifying waveguide and the intermediate waveguide are folded over to lie behind the display waveguide.

12. A flat-panel projection display according to claim 1, in which the modulating means includes two one-dimensional modulators, the first modulating input light at desired angles corresponding to out-of-plane angle in the final image, and the second modulating the in-plane angles for each out-of-plane angle of the final image.

13. A flat-panel projection display according to claim 12, in which the plane of light emerging from the first modulator is turned by a microprism so that the entire apparatus is essentially flat.

14. A flat-panel projection display according to claim 12, in which the output of the first modulator is expanded by a cylindrical optical device so that it illuminates the whole of a one-dimensionally translucent screen adjacent to the second modulator.

15. A flat-panel projection display according to claim 13, in which the waveguide system comprises slab waveguides incorporating the optical elements.

16. A flat-panel projection display according to claim 15, in which the waveguides are stacked, the light from one to the next being coupled at adjacent ends by prisms, and the two modulators are provided on a single substrate.

17. A flat-panel projection display according to claim 12 and constituting a head-up display.

18. A flat-panel projection display according to claim 1, in which the slab is itself modulatable, so that at any one time light from only one row is ejected, a set of one-dimensional modulators providing the input light at the various in-plane angles.

19. A flat-panel projection display comprising a waveguide system including a display slab waveguide having a grating acting to cause light propagating in the waveguide to emerge from one face of the waveguide at an angle depending on the out-of-plane angle of propagation, a lens element for directing light into an edge of the waveguide system, and means for modulating the intensity of the light in the focal plane of the lens element; said means for modulating the intensity of the light as a function of lateral position, relative to the waveguide, the grating being such as to eject light directed into the waveguide system from the slab towards a viewer at an angle depending on the said lateral position;

in which the light emerging from the display slab is modulated by an output panel to give a three-dimensional display.

20. A flat-panel projection display according to claim 19, in which the output panel is a liquid-crystal display panel mounted in front of the display slab, as seen by the viewer.

21. A flat-panel projection display according to claim 19, in which the output panel is a photosensitive reflector array modulated by a light source, and is mounted behind the display slab, as seen by the viewer.

22. A flat-panel projection display according to claim 21, in which the display slab contains a stack of partial reflectors reflecting the input light back towards the output panel and allowing to be reflected back again towards the viewer.

23. A flat-panel projection display comprising a waveguide system including a display slab waveguide having a grating acting to cause light propagating in the waveguide to emerge from one face of the waveguide, a lens element for directing light into an edge of the waveguide system, a magnifying slab waveguide of matching width placed between the lens element and the display slab waveguide so as to expand the light from the lens to the full width of the display waveguide; a one-dimensional cylindrical mirror strip at the end of the magnifying waveguide, conserving out-of plane angle but spreading light in the plane; and in the focal plane of the lens element means for modulating the intensity of the light as a function of lateral position and of elevational direction of travel, relative to the waveguide, the light passing though the magnifying slab waveguide in one direction for magnifying, being reflected by the mirror strip and passing back in the reverse direction for coupling into the display waveguide;

wherein the grating acts to eject light from the magnifying slab waveguide towards a viewer at an angle depending on the said lateral position and elevational direction.

24. A flat-panel projection display comprising a waveguide system including a display slab waveguide having a grating acting to cause light propagating in the waveguide to emerge from one face of the waveguide, a lens element for directing light into an edge of the waveguide system, and in the focal plane of the lens element means for modulating the intensity of the light as a function of lateral position, relative to the waveguide, the grating being such as to eject light directed into the waveguide system from the slab towards a viewer at an angle depending on the said lateral position;

in which the light emerging from the display slab is modulated by an output panel to give a three-dimensional display, the output panel being a liquid-crystal display panel mounted in front of the display slab as seen by the viewer, and the means for modulating is a source of collimated light scanned through the range of output angles by transverse movement or scanning of the light source in synchrony with the modulating means.

* * * * *